Feb. 13, 1940.   A. VANDERVELD   2,190,629
GEARSHIFT MECHANISM
Filed Sept. 23, 1935   5 Sheets-Sheet 1
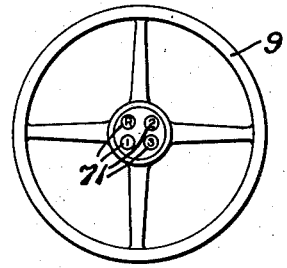
Fig.2.
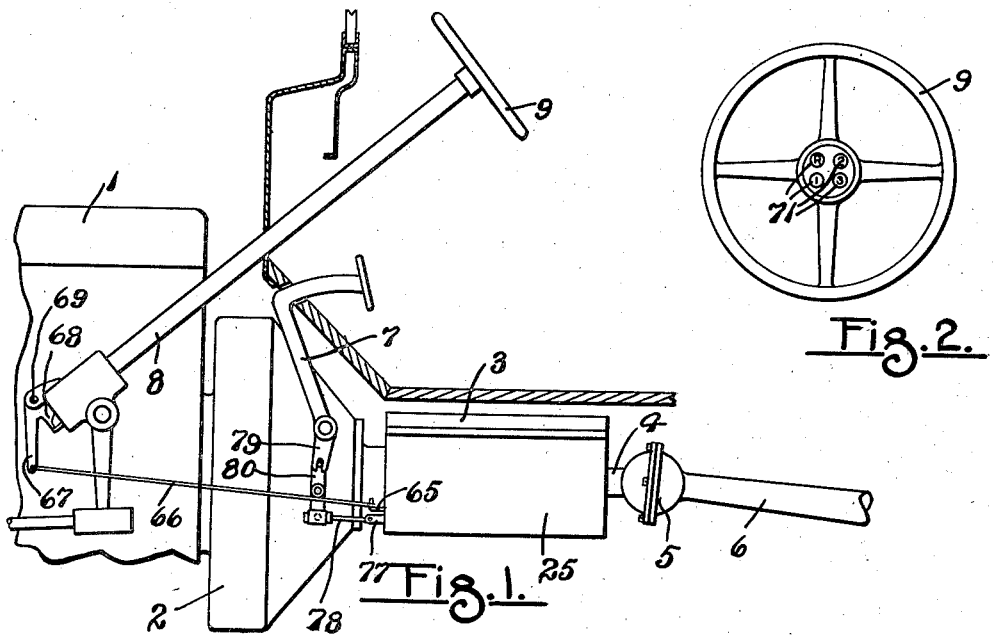
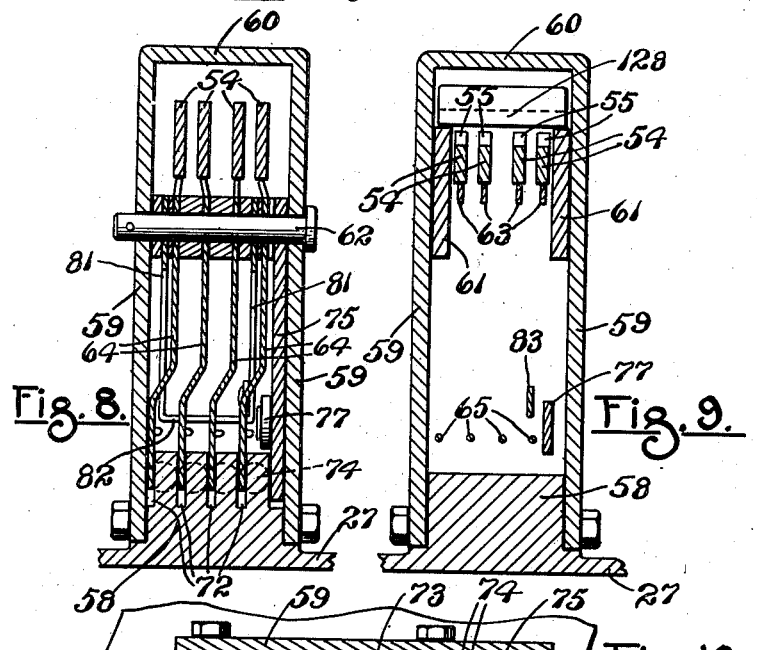
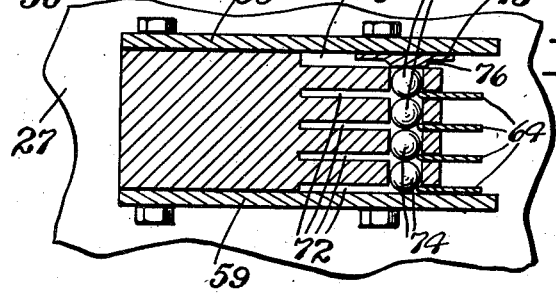
Inventor
Anthony Vanderveld
By Liverance and
Van Antwerp
Attorneys Feb. 13, 1940.    A. VANDERVELD    2,190,629
GEARSHIFT MECHANISM
Filed Sept. 23, 1935    5 Sheets-Sheet 2

Inventor
Anthony Vanderveld
By Liverance and
Van Antwerp
Attorneys

Feb. 13, 1940.    A. VANDERVELD    2,190,629
GEARSHIFT MECHANISM
Filed Sept. 23, 1935    5 Sheets-Sheet 5

Inventor
Anthony Vanderveld
By Liverance and
Van Antwerp
Attorneys

Patented Feb. 13, 1940

2,190,629

UNITED STATES PATENT OFFICE 2,190,629

GEARSHIFT MECHANISM

Anthony Vanderveld, Grand Rapids, Mich., assignor of one-half to Liverance & Van Antwerp, Grand Rapids, Mich., a co-partnership composed of Frank E. Liverance, Jr., Grandville, Mich., and Harold O. Van Antwerp, East Grand Rapids, Mich.

Application September 23, 1935, Serial No. 41,639

8 Claims. (Cl. 74—334)

This invention relates to and is used in connection with change speed gear transmissions, by which rotary motion is imparted from a shaft of a power unit which turns in one direction to a second shaft to be turned at variable speeds with relation to the speed of the power shaft, and in the same direction as the power shaft, or in a direction opposite to the rotation of the power shaft. The primary object of the invention is to use the same in connection with motor vehicles, utilizing the engine which drives the motor vehicle to operate the transmission gearing and change the same to effect the several speeds forward and the reverse speed.

Another object of the invention is to provide manually operable means which may be operated to select a particular speed desired and which, when the selecting mechanism is operated, and the clutch interposed between the engine and the propeller shaft of the automobile disconnected, the engine will proceed to change the gears to the speed selected. This insures that any change of gearing in the transmission shall take place only when the engine is disconnected therefrom. It is a further object and purpose of the invention to provide a very compactly arranged mechanism which will occupy space in the automobile now unoccupied, and to provide the mechanism of parts which have minimum weight, which are easily manufactured and assembled and enclosed in housings for the protection thereof, and which have strength and durability so as to practically serve the purposes for which they are designed. While I have disclosed the invention as applied to an automobile change speed transmission gearing, the invention is not necessarily limited to automobile or motor vehicle use, but may be applied in many other places where a change of speed of a driven shaft or machine may be desired relative to the speed of rotation of a power shaft which drives the machine or driven shaft. In motor vehicles the power shaft is the crank shaft of the internal combustion engine now almost universally used in motor vehicles.

Many other objects and purposes together with novel constructions and arrangements of parts for obtaining the same will appear as an understanding of the invention is had from the following description, taken in connection with the accompanying drawings, in which, Fig. 1 is a fragmentary side elevation showing the application of the invention to a motor vehicle and the location of the structure of the invention with respect to the engine and transmission gearing.

Fig. 2 is a plan view of the selector buttons and the steering wheel at the center of which the same are preferably, though not necessarily, mounted.

Figure 3:
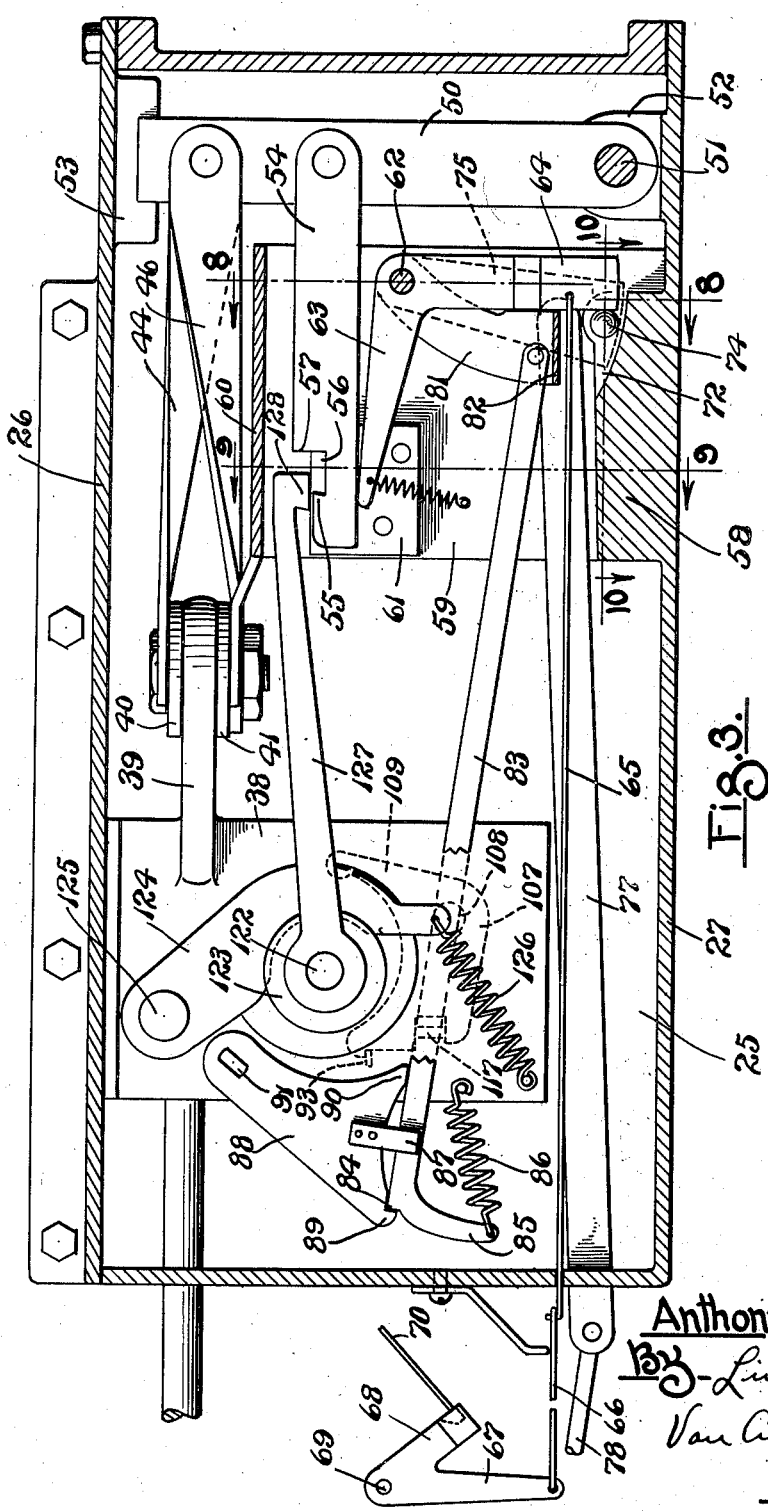
Fig. 3 is a longitudinal vertical section through the mechanism which is located, preferably at one side of the transmission gearing housing, and by means of which the selection is attained and the gear shifting accomplished.

Figs. 8 and 9 are fragmentary vertical sections substantially on the planes of lines 8—8 and 9—9, respectively, of Fig. 3 looking forward in the direction indicated by the arrows, and Fig. 10 is a fragmentary horizontal section on the plane of line 10—10 of Fig. 3 looking downward.

Like reference characters refer to like parts in the different figures of the drawings.

The invention is shown as applied to a motor vehicle having the usual engine 1, clutch and fly-wheel casing 2, and transmission casing 3 through and beyond the rear end of which a shaft 4 extends which is connected by a universal joint 5 with the propeller shaft 6 of the automobile. The propeller shaft, as is well known, extends rearwardly to and drives the differential gearing which in turn operates the rear axle for driving the rear wheels of the automobile. The clutch is of any well known type adapted to be disconnected by pressing forwardly on a clutch pedal 7. The automobile has the usual steering post 8 at the upper end of which a steering wheel 9 is mounted.

The transmission gearing, housed within the transmission housing or casing 3, includes a countershaft 10 above shaft 4 and paralleling which is a fixed guide rod 11 on which two sleeves 12 and 13 are mounted for slidable movement. Sleeve 12 has a socket 14 open at one side. Extending in opposite direction from the sleeve 12 is a yoke 15 engaging with a collar 16 which is connected with a sliding gear 17, the gear and collar being shiftable along the countershaft 10 when the sleeve 12 is moved on the guide rod 11. The socket 14 is at the upper side of the sleeve 12. The sleeve 13 likewise has a similar socket 18 but at its underside and below the rod 11 (Fig. 5), and a yoke 19 projects from the sleeve engaging with a collar 20 which is connected with a gear 21, the collar 20 and the gear 21 being shiftable along the countershaft 10 with the movements of the sleeve 13.

The shifting of these two yokes and their respective gears causes the usual shifting movement. It is not necessary to further describe in detail the transmission gearing, as such transmission gearing is of standard and well known construction and well known to all skilled in the art.

Figure 5:
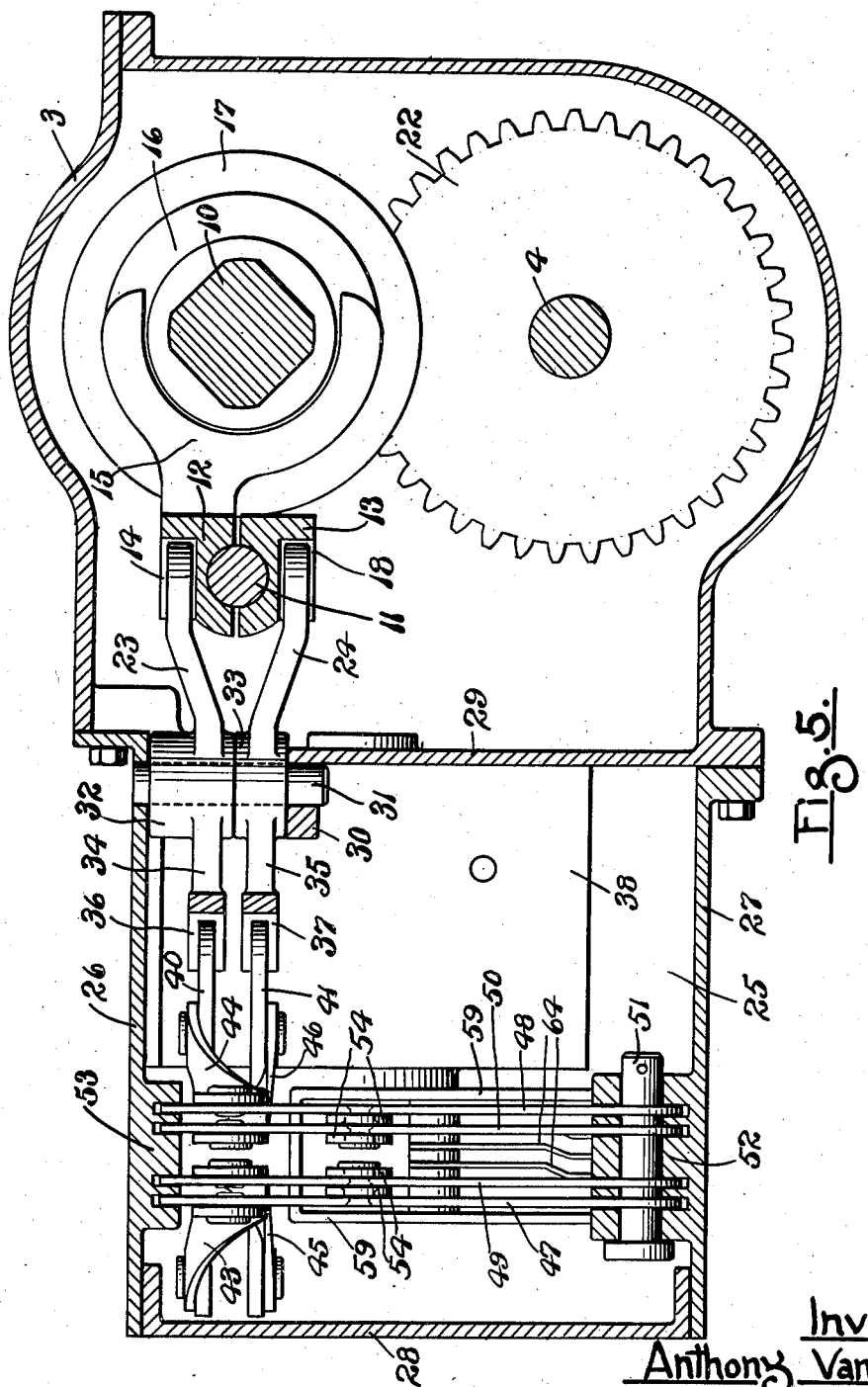
Fig. 5 is a transverse vertical section on the line 5—5 through the mechanism shown in Fig. 4.

The sockets 14 and 18, respectively, (Fig. 5) receive the free ends of arms 23 and 24 which are arms of pivotally mounted levers, one located directly over the other as shown in Fig. 5. These levers extend through a side of the transmission housing and into a second housing 25 located alongside the transmission housing. The second housing has a top or cover 26, bottom 27, a vertical outer side 28 and vertical ends, and its inner side 29 is provided by the adjacent side of the transmission housing as shown in Fig. 5. A lug 30 extends laterally from said vertical side 29. Between it and the cover 26 a vertical pin 31 is mounted upon which journals 32 and 33 are mounted for pivotal movement. It is from these journals that arms 23 and 24 extend to the sockets 14 and 18 as shown in Fig. 5, while other arms 34 and 35 respectively, extend in opposite directions within the housing 25. The arms 34 and 35 are provided with U-shaped open sockets 36 and 37, respectively, at their free ends.

Within the housing 25 and positioned in front of the levers described is a closed housing 38 within which, as will later appear, a one revolution clutch mechanism is mounted. Housing 38 is disposed with one end against and connected to the common partition 29 between the transmission housing and the housing 25, and extends into the housing 25. From the housing 38 an arm 39 extends outwardly and to the rear at the upper and lower sides of which levers 40 and 41, respectively, are pivotally mounted between their ends. Said levers are equipped with rounded heads 42 at one end which seat in the sockets 36 and 37 as shown in Fig. 5. Bars 43 44, 45 and 46 are pivotally mounted at their front ends to the levers 40 and 41. The bars 43 and 44 are pivoted to the lever 40 at opposite sides and at equal distances from the pivotal axis about which the lever turns. Similarly, the bars 45 and 46 are pivotally connected with the front ends to their lower lever 41. These bars extend rearwardly and are twisted so as to bring their rear end portions in vertical planes, their front end portions lying in horizontal planes. Said bars 43 to 46, respectively, are connected at their rear ends to vertical bars 47, 48, 49 and 50 which are pivotally mounted at their lower ends on a pivot pin 51 which passes through a lug 52 (Figs. 3 and 5) cast integral with and extending upwardly from the bottom 27 of the housing 25. The upper ends of the bars 47 to 50, inclusive, are guided in suitable slots cut in a lug 53 which is cast with and extends downwardly from the cover 26 of housing 25.

A distance below the upper end of each of the bars 47 to 50, inclusive, a horizontal bar 54 is pivotally connected at its rear end, extending forwardly as shown in Fig. 3. Each of the bars 54 at its front end portion and at its upper side has parts cut or machined away, leaving an upwardly extending hook at 55, back of which is a recess 56, and a vertical shoulder 57 at the rear side of the recess 56.

A second lug 58 is cast with the bottom 27 of the housing 25 in front of the lug 52 and serves as a support for an inverted U-shaped member having parallel vertical sides 59 connected at their upper ends by an integral cross member 60. The U-shaped member is readily formed from a piece of flat metal bent into the desired shape. Plates 61 are permanently secured to the inner side of each of the vertical side members 59 in a position such that the front ends of the bars 54 lie between said plates with the upper edges of the hook portions 55 slightly below the upper edges of plates 61, and with the shoulders 57 extending above the upper edges thereof, as shown in Fig. 3.

A horizontal pin 62 extends through and is supported by and between the sides 59 near the rear edge portions thereof and below the bars 54 (Fig. 3). A plurality of bell crank levers, having arms 63 and 64, are pivotally mounted on the pivot rod 62 and suitably spaced from each other by means of spaced collars (Fig. 8). The arms 63 extend one under each of the bars 54, there being four bell crank levers and four of the bars 54 as shown in Fig. 8. The forward end portions of the bars 54 rest upon the forward ends of the arms 63. The arms 64 of the bell crank levers extend downwardly from the pivot pin 62. A wire 65 is connected to each of the arms 64, there being four of said wires to correspond with the four bell crank levers and the four bars 54. The wires 65 extend forwardly through the front end of the housing 25, and are connected by links 66 to the arms 67 of four bell crank levers which are pivoted at 69 at the lower end of the steering post 8 as shown in Fig. 1, the other arms 68 of the bell crank levers coming underneath the lower end of the steering column. Four wire rods 70 pass downwardly through the steering column to engage against the upper sides and at the free ends of the arms 68. The rods 70 at their upper ends carry suitable buttons 71 which are provided with suitable indicating characters which, as shown in Fig. 2, indicate the several speeds of the transmission gearing, such as first, second and third forward speeds, and reverse speed.

It is evident that by pressing downwardly, upon a selected button 71 the associated bell crank lever at the lower end of the steering column will tend to be turned in a clockwise direction thereby pulling the associated wire 65 forward, to turn the bell crank lever to which said wire is connected about the pivot 62, whereupon the arm 63 of said last mentioned bell crank lever serves to lift the bar 54 directly beneath which it is located. It is to be understood that a suitable housing may be provided at the center of the steering wheel and that the indicator buttons 71 will extend therethrough so as to be accessible from above for operation.

As shown in Figs. 3 and 10, the lower ends of the arms 64 of the bell crank levers described enter slots 72 cut in the rear upper corner portion of the part 58. There is also a wider slot 73 at one side as shown in Fig. 10, the purpose of which will hereafter appear. A cylindrical passage is bored horizontally through the part 58 and across the slots 72 wherein four cylindrical balls 74 are placed. A bar 75 is pivotally suspended from the pivot pin 62 and extends downwardly therefrom in the same direction as the arms 64 of the bell crank levers and enters the wider space or slot 73. It has a thickened portion 76 at one side to come against one of the balls 74 (see Fig. 10) preventing any entrance of an arm 64 between any two of the balls until the bar 75 has been moved out of the way. It is also evident that when said bar 75 has been moved out of the way and one of the arms 64 moved forward between two of the balls, it is then impossible to move another of the arms 64 in a forward direction, so that there can be a depression of one only of the buttons 71 at a time, and that only when the bar 75 has been moved out of the way to release the balls 74.

A bar 77 (Figs. 1 and 3) is connected near the lower end of member 75 and extends forward through the front end of the housing 25 and has a link 78 connected at its front end. An arm 79 extends downwardly from the clutch pedal 7, or from the shaft on which it is mounted, which has a pin and slot connection, shown in Fig. 1, with a lever 80 pivotally mounted between its ends to the lower end of which the forward end of the link 78 is secured. When the clutch pedal is depressed to disconnect the clutch, bar 77 is pulled in a forward direction and moves the member 75 forward to thus free the balls 74 for the passage of an arm 64 of one of the bell crank levers between two adjacent balls. It is accordingly evident that depression of a selector button 71 can take place only when the clutch has been disengaged through depression of the clutch pedal 7.

A stirrup member is pivotally mounted on and depends from the pin 62 having two spaced apart sides 81 integrally connected at their lower ends by a cross member 82 which lies in front of the arms 64, whereby the stirrup member is turned clockwise about the axis of the pin or rod 62 when any one of the selector buttons is pushed down. The forward movement of the stirrup moves a bar 83 longitudinally forward, said bar at its rear end being connected to one side 81 of the stirrup member (Fig. 3). Bar 83, at its front end, has a shoulder 84 and a downwardly extending finger 85, to the lower end of which one end of a tension spring 86 is secured, the opposite end being connected to the housing 38. The spring acts to lift the forward end of bar 83 and move the bar to the rear when free to do so.

The forward portion of bar 83 is guided between two guide members 87 fixed to and extending downwardly from an irregularly shaped trip member 88 located above bar 83 and connected with the single rotation clutch mechanism housed within the housing 38 and serving to trip said clutch mechanism on forward movement of the bar 83 as will be later described. At the lower front corner of the member 88 is a hook 89 against which the shoulder 84 normally bears, and at the lower rear corner there is a foot 90 to the member 88 to bear against the upper edge of bar 83. At its upper end, member 88 is connected to a shaft 91 which extends through a side of the housing 38 and has an arm 92 secured to and depending from the inner end thereof. The lower end of the arm 92 (Fig. 7) has a lug 93 turned at right angles thereto.

Figure 4:
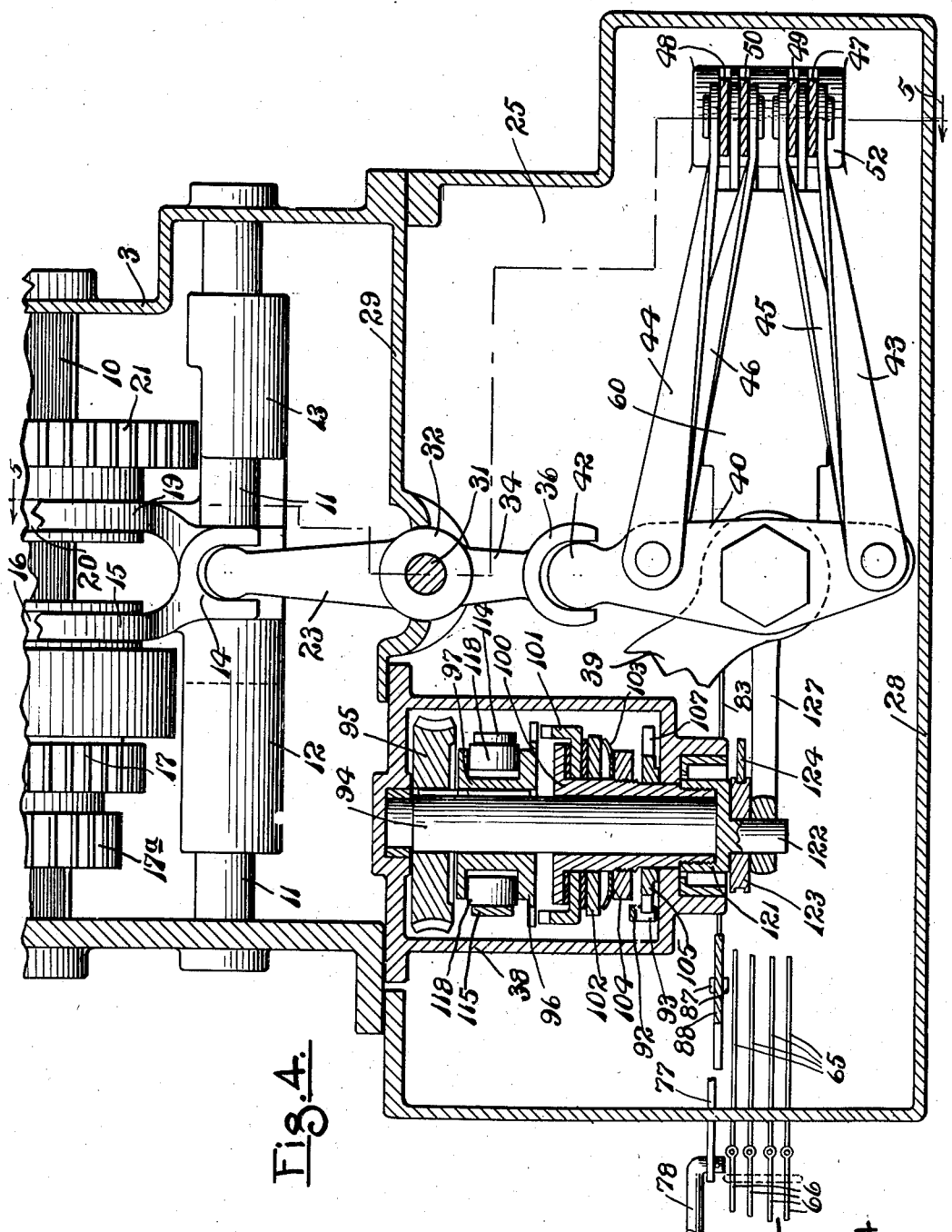
Fig. 4 is a horizontal section therethrough and also through the transmission gearing at one side thereof, the same being fragmentarily shown.

The single revolution clutch mounted within the housing 38 includes a shaft 94 on which a worm gear 95 is keyed near one end of the shaft as shown in Fig. 4. There is also splined on the shaft 94, adjacent the worm gear 95, a disk-like clutch member 96 which is integral or connected with a flanged collar 97, the clutch member 96 having a plurality of spaced apart radial fingers extending therefrom. The worm gear and the shaft 94 are driven by a worm 98 on a shaft 99 (Fig. 7), which shaft extends forward to the engine and is driven by any suitable rotating part thereof, for example, by a take-off from a cam shaft of the engine. Whenever the engine is running the clutch member 96 is continuously rotated.

An elongated sleeve 100, flanged at its inner end as shown in Fig. 4, is loosely mounted on the shaft 94. A cooperating clutch member 101 of cup-like form is placed over the sleeve and against the flange of the sleeve 100 with a suitable washer, as shown between. A second washer is located at the opposite side of the clutch member 101 and a flat disk 102 placed thereagainst. A spring steel plate 103 with spaced apart radial fingers around its periphery is then placed over sleeve 100 with the fingers bearing against the disk 102, and a nut 104 is threaded into the sleeve against the disk 103. The pressure of the disk 103 against disk 102 is regulated by the extent that the nut 104 is screwed onto the sleeve. The sleeve and the clutch member normally remain at rest with the shaft 94 rotating within the sleeve.

A disk 105, having a cam tooth 106 projecting from one side, is fixed to the sleeve 100 and lies against the inner side of the housing 38 (Fig. 4). An irregularly shaped lever 107 of flat metal is located underneath the cam disk 105 and is mounted on a rod 108, having one arm 109 extending upwardly to one side of the disk 105, the upper end of the arm having a rounded terminus as shown at 110. The other side of the member 107 extends upwardly a shorter distance and is formed with a hook 111 underneath which the dog 93 on arm 92 is adapted to engage. The member 107 is notched at 112 (Fig. 7) at the side where the dog 111 is located and a short distance above the lower edge of said member 107.

Figure 6:
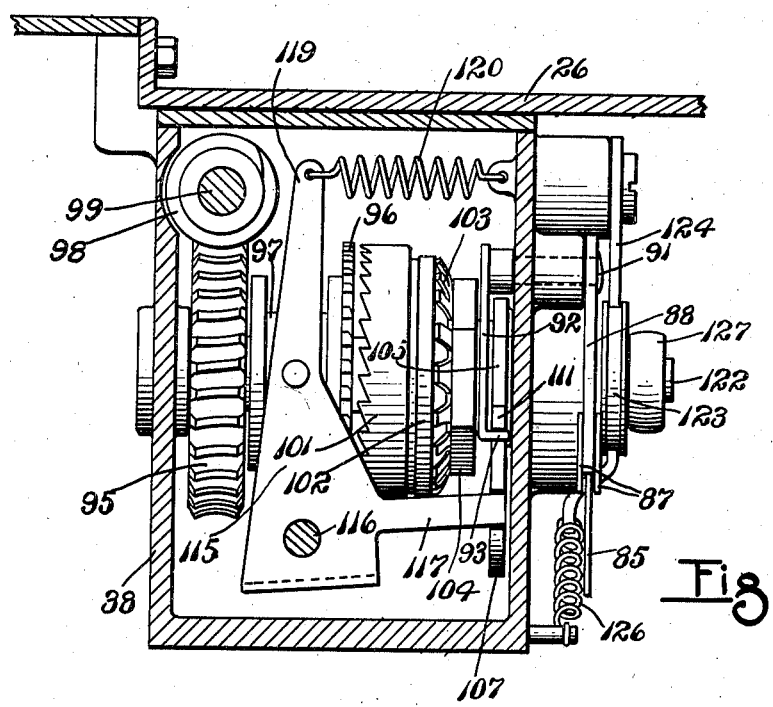
Fig. 6 is an elevation of a single revolution automatic clutch mechanism which is used to effect the immediate gear changing, the housing thereover being shown in section.
Figure 7:
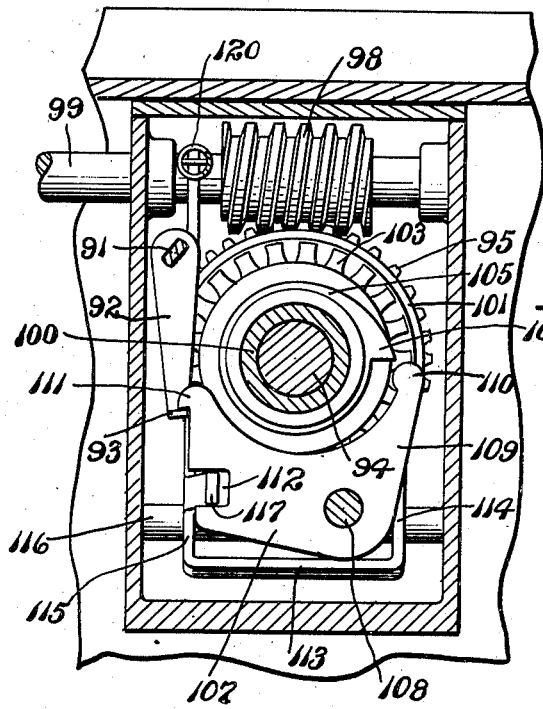
Fig. 7 is a vertical section of the mechanism shown in Fig. 6, at right angles thereto.

A bar, bent into U-shape and having a lower horizontal section 113 with spaced apart upwardly extending arms 114, 115, is mounted on a rod 116 near the lower ends of said sides and in the plane substantially of the flanged collar 97. An arm 117 extends from the vertical side 115 and enters the notch 112 (Figs. 6 and 7). Rollers 118 are carried by the sides 114 and 115 and ride in the annular groove of the flanged collar 97. The side 115 is extended nearly to the top of the housing 38 (Fig. 6) as at 119, and a coiled tension spring 120 is connected thereto at one end and to a side of the housing 38 at the other end, the tendency of which is to turn the member about the axis of rod 116 (Fig. 6) in a clockwise direction and bring the rotating clutch member 96 into engagement with the stationary clutch member 101. However, when the dog 93 is engaged under the hook 111 (Fig. 7) the member 107, acting through the arm 117, stretches the spring 120 and holds the clutch members 96 and 101 disengaged.

On the outer end of the sleeve 101 (Fig. 4) a cap 121 is threaded so that the cap will rotate with the sleeve. A pin 122 projects from the cap. The axis of the pin is eccentric to the longitudinal axis of shaft 94 and sleeve 100. A grooved disk 123 is carried on the pin 122 outside the housing 38 (Figs. 3 and 4) and an irregularly shaped bar 124, pivoted at its upper end at 125 on the housing 38, is formed with a concaved side to bear against the disk and seat in the groove thereof, and is held against the same by the force of a tension spring 126 connected at one end to the lower end of the member 124 and at the other end to the housing 38 (Fig. 3).

A bar 127 is formed with an eye at its front end to pass over the pin 122. This bar extends to the rear and is formed at its rear end with a downwardly extending hook portion which rides on the upper edges of the plates 61 (Fig. 3). It is apparent that on rotation of the sleeve 100 the bar 127 is reciprocated and the hooklike head 128 slides back and forth over the supporting plates 61 which carry it.

*Operation*

By disconnecting the clutch, through operation of the pedal 7, and the depression of any selected button at 71, a bar 54 is lifted through the turning movement imparted to the bell crank lever below it. The downwardly extending arm 64 of such bell crank lever, being moved forward, thereupon moves against the part 82 of the stirrup member and moves the bar 83 longitudinally forward whereupon shoulder 84 on bar 83 against the hook at 89 serves to turn the shaft 91 until the foot at 90 presses the front end of bar 83 down far enough to pass by the hook 89. Turning shaft 91 causes the arm 92 (Fig. 7) to move so as to disengage the lug 93 from the hook at 111. This releases member 107 and the arm 117 engaged therewith so that the spring 120 (Fig. 6) moves the rotating clutch member 96 into engagement with the clutch member 101. The clutch member 101 is thereupon rotated and drives the sleeve 100, the cap 121 secured thereto and moves the pin 122 through a circular path about the axis of the shaft 94 thereby reciprocating the bar 127.

When the sleeve 100 has made one reciprocation the cam at 106, riding against the rounded head 110 of arm 109, turns the member 107 so as to lift the bar or finger 117 stretching spring 120 and disengaging the clutch members. The pressure upon the button at 71 having been released bar 83 is returned to its original position thereby permitting the arm 92 (Fig. 7) to return to original position such that the automatic turning of the member 107 in a clockwise direction causes the same to engage its hook 111 with the lug 93 whereby, with this clutch mechanism, one complete revolution and one only is performed upon a single tripping thereof. The bar 124, acted upon by the spring 126 bearing against the grooved disk 123, acts to move the inactive clutch member to its original position which it had when it started, there being sufficient force in the spring 126 for this purpose, should it stop a short distance from such original position. This action occurs inasmuch as the disk 123 is mounted upon the eccentrically located pin 122 and the line of action of the bar 124 due to the spring 126 is arranged to direct the said pin to the desired circumferential position.

The position of the bars 54, as shown in Fig. 3, is that which they occupy when the gearing is in neutral, with no gearing connection between the driven shaft 4 of the transmission and the engine of the automobile. If the gearing is in neutral the first or backward movement of the bar 127 when it is reciprocated does nothing to any of the bars 54. One of the bars 54 having been elevated because of the particular selection made depressing a selected button 71, it is evident that when the bar 127 has reached its rearmost position it drops into the notch 56 of the elevated bar 54, engaging with the hook at 55, so that on the completion of the reciprocatory movement of the bar 127 in a forward direction, it pulls the bar 54 with which it is connected forwardly, and actuates one of the bars 43 to 46, that is, the one which is connected with the particular vertical bar 50 which in turn is connected with the bar 54 which has been pulled in a forward direction. This causes a movement of either the lever 40 or 41, so as to shift a gear from neutral position into meshing engagement with a selected gear of the transmission gearing.

When the next shift of gear is to occur the same operation is performed. The selected button at 71 is depressed contemporaneously with or immediately after the clutch pedal 7 is moved forward and downward. The same single revolution of the one rotation clutch mechanism occurs with the same reciprocation with the bar 127. However, in this operation the bar 54 which has previously been moved forward has its shoulder 57 engaged by the hook 128 on the rearward movement of bar 127, moving it back to neutral position and shifting the gears which have been in mesh to disengaged or neutral position. Then with the completion of the single rotation of the sleeve 100 and the final forward movement of the bar 127, the selected bar 54 which has been lifted is connected with the hook head 128 and is moved forward thereby operating the lever 40 or 41 with which it is connected so as to perform the selected shift of gears. In this way any one of the four gear shifts can be readily performed by merely selecting the particular button 71 that is needed, and depressing it simultaneously with or after the automobile clutch is disengaged.

When gears of the transmission are engaged and it is desired to place the transmission gearing in neutral, the clutch pedal 7 should be operated and any one of the buttons at 71 depressed and at once released. This will set the single revolution clutch in operation but will release any bar 54 which has been lifted so that it may drop to its lower position before the forward reciprocatory movement of the bar 127 takes place. The only thing that will occur will be that the head 128 will engage against the shoulder 57 of a bar 54 which is in forward position pushing it back to neutral and thereby placing the transmission gearing in neutral.

The construction described is practical and complete. It has been built and operated and serves the purposes for which it is designed in an especially satisfactory manner. The parts are made in the main from sheet metal stampings, are readily assembled and the cost of manufacture is relatively low. The connection of the clutch member 101 to the sleeve 100 is of a yielding type so that there is no danger of any breakage of parts under any conditions of operation.

The invention is defined in the appended claims and is to be considered comprehensive of all forms of structure coming within their scope.

I claim:

1. In a gear shifting device, a plurality of gear shifters, each including a hook and a shoulder back of and above the hook, an actuating member above and extending across the hook portions of all of said gear shifters, means for reciprocating the actuating device, whereby the same will pass over said hooks and engage the shoulder of said gear shifters to thereby force the same into alinement and to a position whereby any gear shifter may be elevated to have the hook thereof engage with the actuating device.

2. In a gear shifting device, a series of gear shifters each including a hook, an actuating member located above and across all the hooks, means to longitudinally reciprocate said actuating member back and forth, means to elevate a selected gear shifter into position to effect connection of the hook thereof with said actuating member, and positive means preventing the simultaneous elevation of two or more of said gear shifters.

3. In a gear shifting device, a series of gear shifters, an engine for actuating the gear shifters, normally disconnected therewith, means for connecting the engine to a selected gear shifter, means for disconnecting said engine upon completion of a predetermined actuation of said gear shifter and means including an eccentric and a spring actuated member riding thereagainst, for returning the first mentioned means to an identical position after each shifting operation.

4. In a mechanism of the character described, a plurality of elongated shifting elements mounted for pivotal and longitudinal movement, a series of pivotally mounted bell crank levers, one for each shifting element, an actuating member located adjacent the shifting elements and normally disengaged therefrom, means to give the actuating member reciprocatory movements, means for individually operating said bell crank levers, whereby upon the operation of a selected bell crank lever, the shifting element associated therewith is moved about its pivot into position to be engaged by the actuating member and to connect therewith and be moved thereby, as specified.

5. In a motor vehicle having an engine, a sliding gear transmission gearing, and a clutch between the engine and gearing, shifting elements one for each gear change of the transmission gearing, a common actuating member for all of the shifting elements, means including a plurality of bell crank levers for manually moving a selected shifting element into position to be connected with the said actuating means, engine operated means normally disconnected from the engine for operating the actuating means, and means for simultaneously connecting the operating means with the engine and for moving a shifting element into position to be connected with the actuating means, as and for the purposes specified.

6. A construction containing the elements in combination defined in claim 5, combined with means for preventing connection of the engine and said operating means and for preventing movement of a selected shifting element into position to be connected with the actuating means except when the clutch between the engine and transmission gearing is operated to disconnect said engine and gearing.

7. In an automobile, an engine, a steering post, a steering wheel at the upper end of the post, a selective sliding gear transmission, gear shifting mechanism associated with said transmission, including a plurality of shifting means, an actuating means therefor, a plurality of selective indicators located on the steering wheel, means between said indicators and the shifting means, whereby on operation of a selected indicator, one of said plurality of shifting means will be moved into position to engage with the actuating means, and means for operating the actuating means from the engine of the automobile, combined with means for connecting said actuating means with the engine of the automobile upon operation of any one of said indicators.

8. In a gear shifting device, a series of gear shifters, a common actuating means for all the gear shifters normally out of engagement therewith, means for driving said common actuating means including a single revolution clutch, and means including a plurality of bell crank levers to manually operate a selected gear shifter into position for engagement with the actuating means.

ANTHONY VANDERVELD.